(12) United States Patent
Ohgishi

(10) Patent No.: US 8,042,111 B2
(45) Date of Patent: Oct. 18, 2011

(54) INFORMATION PROCESSING SYSTEM AND COMPUTER READABLE RECORDING MEDIUM STORING AN INFORMATION PROCESSING PROGRAM

(75) Inventor: Ryosuke Ohgishi, Osaka (JP)

(73) Assignee: Kyocera Mita Corporation (JP)

( * ) Notice: Subject to any disclaimer, the term of this patent is extended or adjusted under 35 U.S.C. 154(b) by 867 days.

(21) Appl. No.: 12/062,417

(22) Filed: Apr. 3, 2008

(65) Prior Publication Data

US 2008/0250409 A1 Oct. 9, 2008

(30) Foreign Application Priority Data

Apr. 5, 2007 (JP) ................. 2007-099420

(51) Int. Cl.
*G06F 9/46* (2006.01)
(52) U.S. Cl. ........................................ 718/101; 718/104

(58) Field of Classification Search ........................ None
See application file for complete search history.

(56) References Cited

FOREIGN PATENT DOCUMENTS

JP 02-214960 8/1990

*Primary Examiner* — Emerson Puente
*Assistant Examiner* — Camquy Truong
(74) *Attorney, Agent, or Firm* — Stephen Chin, Esq.

(57) ABSTRACT

A unit: (a) sets event largest possible values used for limitation of the number of tasks and/or the size of areas in a buffer; (b) generates a task without reaching the event largest possible values when receiving an event, and reserves an area in the buffer for the task; (c) determines whether another event has been received before process of the task is completed; (d) deletes the task and releases the area if another new event has not been received; (e1) if it has been received and both the number of tasks and the size of the areas do not reach the event largest possible values, generates a new task and reserves another area in the buffer; and (e2) if it has been received and any of them reaches any of the event largest possible values, reuses the task and the area for the new event.

6 Claims, 3 Drawing Sheets

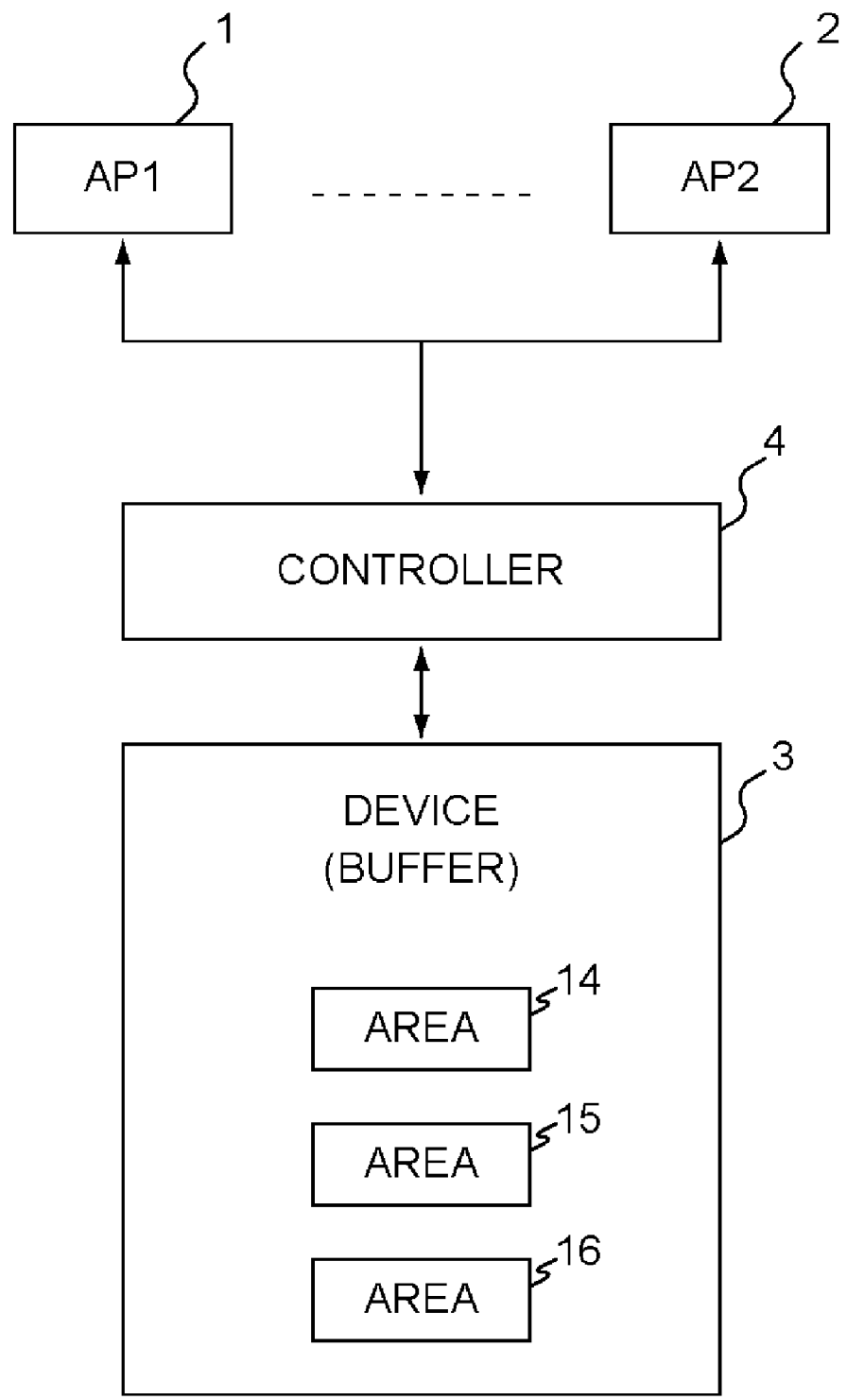

INFORMATION PROCESSING SYSTEM AND COMPUTER READABLE RECORDING MEDIUM STORING AN INFORMATION PROCESSING PROGRAM

This application is based on Japanese Patent Application No. 2007-099420 filed on Apr. 5, 2007, the contents of which are hereby incorporated by reference.

BACKGROUND OF THE INVENTION

1. Field of the Invention

This invention relates to an information processing system and a computer readable recording medium storing an information processing program for processing tasks generated based on events transmitted from one or more peripheral devices after storing the task into a buffer.

2. Description of the Related Art

In general, when print data is transmitted from a personal computer to an image forming device such as a printer, processing rate of image forming process based on the print data received by the image forming device is much lower than communication rate between the computer and the image forming device.

Consequently, image forming process may stop intermittently due to low rate of the image forming process when the image forming device receives print data transmitted from one or more personal computers one after another. For this reason, generally, a buffer of semiconductor or the like is set up for processing the print data in the image forming device or a print server between the computer and the image forming device so that image forming process is performed at the same rate as printing rate by storing the received print data temporarily and reading out it in turn.

As described above, it is well known that in an information processing system, a controller such as a print server generates tasks based on events (e.g. print data) transmitted from one or more peripheral devices (e.g. personal computers), and the tasks generated by the controller are stored in a buffer, then a processing device (e.g. an image forming device) processes the tasks.

There is well known one of such information processing systems that has an intermediate buffer having continuous physical addresses, buffer-device intermediate transferring means that performs data transfer between physical addresses of an input/output device and the intermediate buffer, buffer-to-buffer intermediate transferring means that performs data transfer between the intermediate buffer and a target buffer as the final destination of the data transfer, and data transfer controlling means that controls the buffer-device intermediate transferring means and the buffer-to-buffer intermediate transferring means to get unit and timing of the data transfer suitable for the input/output device, and moreover, a transmission buffer as the intermediate buffer has been provided before transmitting data from a peripheral device to a host device. See Japan Laid-Open Patent Application H02-214960, for example.

SUMMARY OF THE INVENTION

In the information processing systems described above, however, the intermediate buffer is filled immediately under some statuses of the host device (e.g. in case that the host device can not receive data), and consequently, not only data transfer performance declines, but resources of the controller are spent wastefully.

In view of this circumstance, it is an object of the present invention to provide an information processing system and a computer readable recording medium storing an information processing program capable of increasing data transmission performance and using the controller in an efficient way.

An information processing system according to an aspect of the present invention has a unit that generates tasks; and a device having the buffer, the apparatus processes the tasks. The unit: (a) sets event largest possible values used for limitation of the number of the tasks and/or the size of areas in the buffer; (b) generates a task without reaching any of the event largest possible values when an event is received from any of the one or more peripheral devices, and reserves an area in the buffer for the task; (c) determines whether or not another new event has been received from any of the one or more peripheral devices before process of the task is completed; (d) deletes the task and releases the area in the buffer for the task upon completion of the process of the task if another new event has not been received; (e1) if another new event has been received and both the number of the tasks and the size of areas in the buffer for the tasks do not reach the event largest possible values, generates a new task and reserves an area in the buffer for the new task; and (e2) if another new event has been received and either the number of the tasks or the size of areas in the buffer for the tasks reaches any of the event largest possible values, reuses the task and the area for the task in the buffer for the new event after process of the task is completed.

Further, it is desirable to change the size of the reused area in the buffer when the area in the buffer is reused, if the reused area is short or excess for the task generated newly.

Furthermore, it is desirable to set the size of the task or the new task not more than a predetermined size and to generate the task suitable for an interface of the peripheral device when the task is generated.

Furthermore, a personal computer maybe used as the peripheral device, an image forming device may be used as the device that processes the tasks, and a controlling circuit in the image forming device may be used as the unit that generates tasks.

Furthermore, a print server connecting the personal computer and the image forming device may be used as the unit that generates tasks.

Moreover, an information processing program stored in a computer readable recording medium according to an aspect of the present invention causes a computer to perform the steps of:

setting event largest possible values used for limitation of the number of the tasks and/or the size of areas in the buffer;

generating a task without reaching any of the event largest possible values when an event is received from any of the one or more peripheral devices, and reserving an area in the buffer for the task;

determining whether or not another new event has been received from any of the one or more peripheral devices before process of the task is completed;

deleting the task and releases the area in the buffer for the task upon completion of the process of the task if another new event has not been received;

if another new event has been received and both the number of the tasks and the size of areas in the buffer for the tasks do not reach the event largest possible values, generating a new task and reserving an area in the buffer for the new task; and if another new event has been received and either the number of the tasks or the size of areas in the buffer for the tasks reaches one of the event largest possible values, reusing the task and the area for the task in the buffer for the new event after process of the task is completed.

An information processing system and a computer readable recording medium storing an information processing program according to the present invention are capable of increasing data transmission performance and using the controller in an efficient way.

These and other objects, features and advantages of the present invention will become more apparent upon reading of the following detailed description along with the accompanied drawings.

BRIEF DESCRIPTION OF THE DRAWINGS

FIG. 3 shows a block diagram of the information processing system of the embodiment according to an aspect of the present invention.

DETAILED DESCRIPTION OF THE PREFERRED EMBODIMENTS

Hereinafter, an information processing system will be explained as an embodiment according to an aspect of the present invention with reference to drawings.

Figure 1:
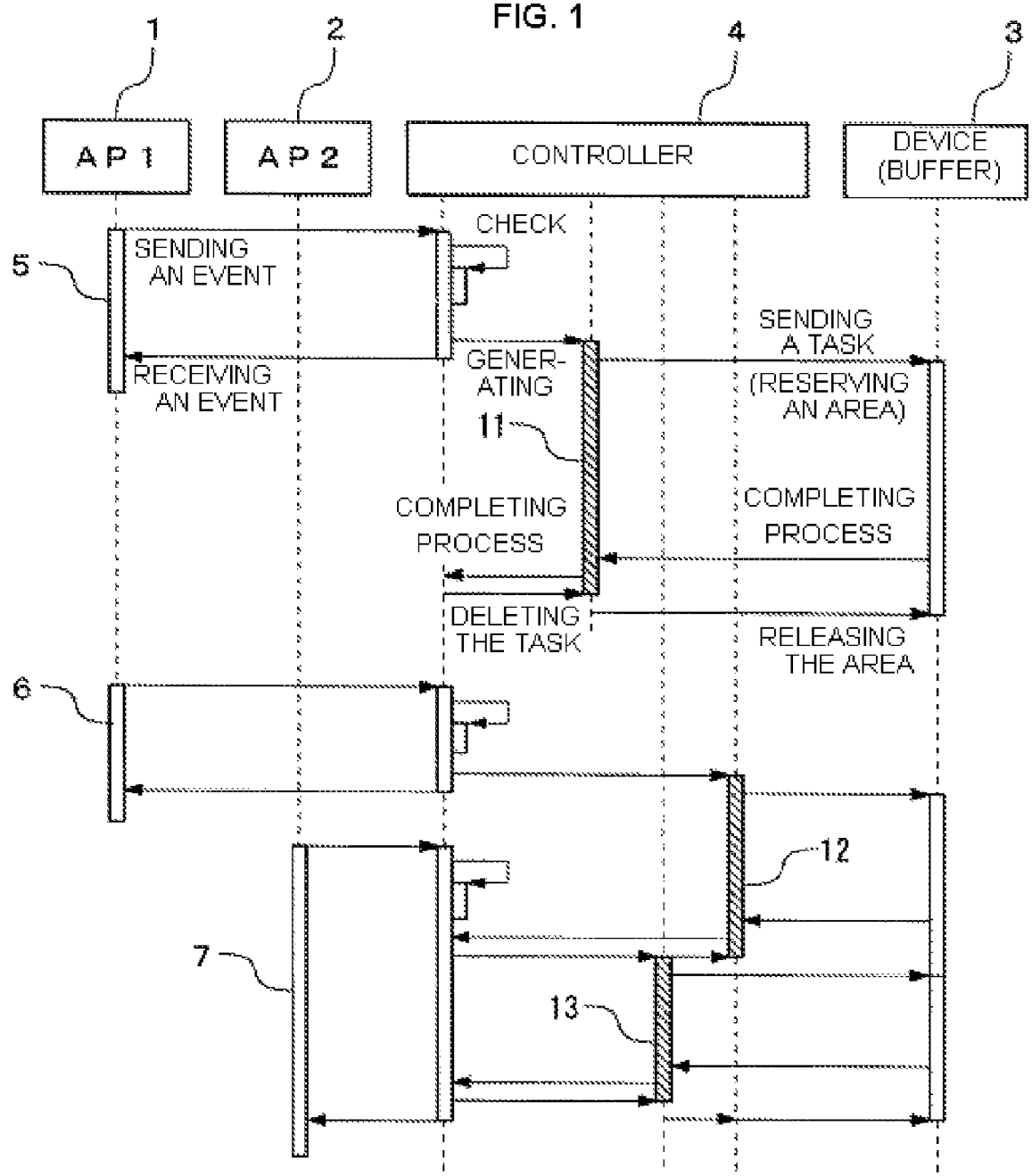
FIG. 1 shows processing sequence in the information processing system of an embodiment according to an aspect of the present invention when both the number of tasks and the size of areas in a buffer for the tasks do not reach event largest possible values.
Figure 2:
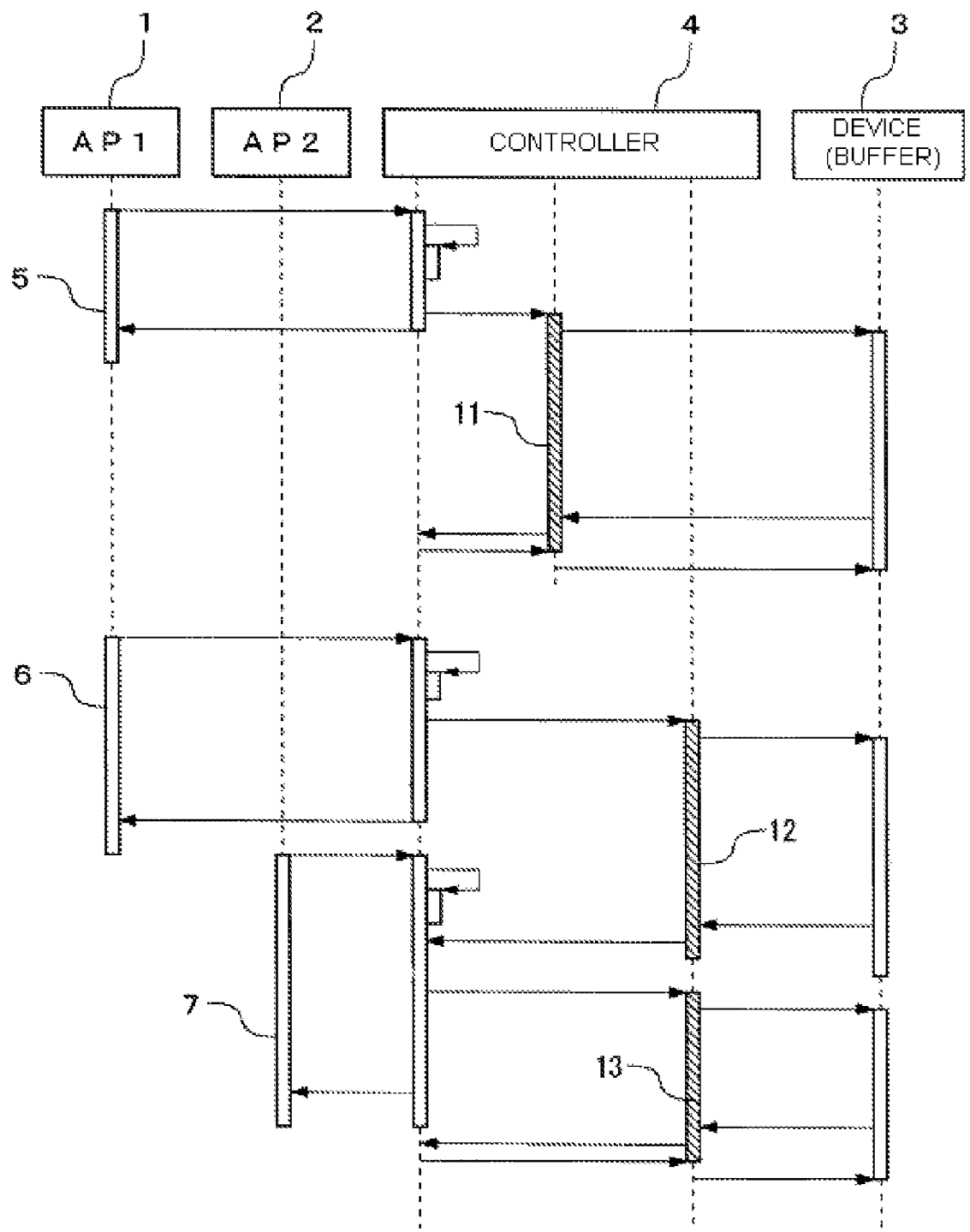
FIG. 2 shows processing sequence in the information processing system of the embodiment according to an aspect of the present invention when either the number of tasks or the size of areas in a buffer for the tasks reaches any of event largest possible values.

FIG. 1 shows processing sequence in the information processing system of the embodiment according to an aspect of the present invention when both the number of tasks and the size of areas in a buffer for the tasks do not reach event largest possible values. FIG. 2 shows processing sequence in the information processing system of the embodiment according to an aspect of the present invention when either the number of tasks or the size of areas in a buffer for the tasks reaches any of event largest possible values. FIG. 3 shows a block diagram of the information processing system of the embodiment according to an aspect of the present invention.

The system shown in FIG. 3 has peripheral devices 1 and 2 such as personal computers or the like, a buffer 3 and a controller 4. The buffer 3 is equipped in a processing device (i.e. a device for processing tasks) such as an image forming device or the like, and memorizes tasks. The controller 4 is a controlling circuit equipped in the processing device such as an image forming device, a print server connecting the peripheral devices 1 and 2 and the buffer 3, or the like. The controller 4 is embodied, for example, by executing an information processing program in a computer. The information processing program is stored in a computer readable recording medium such as a semiconductor memory, an optical disc, a magnetic disc or the like.

From personal computers as the peripheral devices 1 and 2 to the controller 4, data communication events 5, 6 and 7 are transmitted, and the events 5, 6 and 7 may include print data generated by using applications installed in the personal computers.

The controller 4 sets event largest possible values to largest possible values of system resources that can be used for data communication at its initialization. Here is/are one or two event largest possible value (s) set to the largest possible value of the number of tasks generated by the controller 4 and/or the largest possible value of the size of available area in the buffer 3. If the controller 4 receives the events 5, 6 and 7, the controller 4 generates each of tasks 11, 12 and 13 corresponding to each of the events 5, 6 and 7 with referring to its data format etc. The controller 4 determines the number of current tasks and the size of vacant area in the buffer 3 with referring system resources such of the buffer 3 and the like, and then, generates each of the tasks 11, 12 and 13 so that the number of the tasks does not exceed the event largest possible value as a criterion. Moreover, the controller 4 reserves areas 14, 15 and 16 for buffer area size (i.e. total size of buffer area to be reserved) not to exceed the event largest possible value, and stores the tasks 11, 12 and 13 in the areas 14, 15 and 16 in the buffer 3. The device (i.e. image forming device) processes the tasks stored in the buffer 3.

Specifically, as shown in FIG. 1, if an event 5 is transmitted from the peripheral device 1 of the personal computer to the controller 4, the controller 4 generates a task 11 after confirming that status of system resources satisfies the condition of the event largest possible values. The controller 4, further, reserves an area 14 in the buffer 3 required for the task 11, stores the task 11 in the area 14, and then causes to perform data processing of the task 11 (e.g. data communication processing).

The controller 4 determines whether or not another new event 6 has been received from the peripheral device 1 or 2 before completion of process of the task 11 transmitted from the controller 4 to the buffer 3, and deletes the task 11 and releases the area 14 in the buffer 3 if process of the task 11 has been completed before the new event 6 is received.

If the new event 6 is received by the controller 4 thereafter, the event 6 is processed as well as the event 5. If a new event 7 is received while the task 12 of the event 6 is processed, since a process completion notice of the task 12 has not been received from the device, the controller 4 calculates the number of tasks and the total size of the areas in the buffer 3 assuming that a new task has been generated for the new event 7, based on the number of tasks and the total size of the areas in the buffer 3 confirmed at the time when the task 12 of the event 6 was processed. If the number of tasks and the size of areas in the buffer 3 do not reach the event largest possible values even while the new event 7 is processed, the controller 4 generates a new task 13 and reserves an new area 16 in the buffer 3, and the task 13 is stored into the area 16 in the buffer 3, then will be processed after the task 12. In this way, the tasks 12 and 13 are processed in turn, and the tasks 12 and 13 are deleted and the areas 15 and 16 are released by the controller 4 upon completing process of the task 13.

On the other hand, in case that either the number of tasks or the size of areas in the buffer 3 reaches any of the event largest possible values if the new event 7 is processed, as shown in FIG. 2, at the time when process of the task 12 is completed, the controller 4 reuses the task 12 instead of the task 13 continuously and reuses the area 15 instead of the area 16 in the buffer 3.

When the area 15 is reused instead of the area 16 in the buffer 3, the area 15 in the buffer is enlarged or reduced for adjustment if the area 15 in the buffer 3 is short or excess for the task generated newly.

As mentioned above, according to the information processing system of this embodiment, by generating tasks and reserving buffer areas dynamically for processes (i.e. events) provided from the peripheral devices 1 and 2, it enables to use the controller 4 in an efficient way and to prevent decline of data transmission rate of each destination.

It is also an advantage that the above-mentioned processing can be realized with low cost if software (i.e. program) of an ordinary controller is just changed without any changes of the buffer 3 etc.

In addition, according to such control, it is possible to realize more flexible transmission control, for example, for generating tasks without filling buffer areas easily, by adding one or more attributions to each of transmission tasks as follows:

(a) adding priority,
(b) adding limitation on the size of the buffer or the task not more than a predetermined size, and/or
(c) adding limitation on an interface to be used for data communication to a fixed type of interface (e.g. for network, for USB, or the like).

Incidentally, where an information processing system according to an aspect of this invention has been explained on relation between personal computers and an image forming device in this embodiment, it can be applicable to events of communication processing among other devices.

Additionally, it is possible to set distribution ratio of buffer areas assigned to tasks, and to change the distribution ratio with learning process over changes of buffer areas; for example, the event largest possible value is made large if a new task can not be generated at the predetermined number of times, and contrarily, the event largest possible value is made small if a new task can always be generated for a predetermined period.

What is claimed is:

1. An information processing system that processes tasks generated based on events transmitted from one or more peripheral devices after storing the tasks into a buffer, comprising:
   a unit that generates tasks; and
   a device having the buffer, the device processes the tasks, wherein the unit:
   sets event largest possible values used for limitation of the number of the tasks and/or the size of areas in the buffer;
   generates a task without reaching any of the event largest possible values when an event is received from any of the one or more peripheral devices, and reserves an area in the buffer for the task;
   determines whether or not another new event has been received from any of the one or more peripheral devices before process of the task is completed;
   deletes the task and releases the area in the buffer for the task upon completion of the process of the task if another new event has not been received;
   if another new event has been received and both the number of the tasks and the size of areas in the buffer for the tasks do not reach the event largest possible values, generates a new task and reserves an area in the buffer for the new task; and
   if another new event has been received and either the number of the tasks or the size of areas in the buffer for the tasks reaches any of the event largest possible values, reuses the task and the area for the task in the buffer for the new event after process of the task is completed and wherein the peripheral device is a personal computer, the device that processes the tasks is an image forming device, and the unit is a print server connecting the personal computer and the image forming device.

2. The information processing system according to claim 1, wherein the unit changes the size of the reused area in the buffer if the reused area is short or excess for the task generated newly.

3. The information processing system according to claim 1, wherein the unit sets the size of the task or the new task not more than a predetermined size.

4. The information processing system according to claim 1, wherein the unit generates the tasks suitable for interfaces of the one or more peripheral devices.

5. The information processing system according to claim 1, wherein the peripheral device is a personal computer, and the apparatus that processes the tasks is an image forming apparatus.

6. A computer readable nontransitory recording medium storing an information processing program, the information processing program comprises the steps of:
   generating tasks based on events transmitted from one or more peripheral devices and storing the tasks into a buffer of a device that processes the tasks;
   setting event largest possible values used for limitation of the number of the tasks and/or the size of areas in the buffer;
   generating a task without reaching any of the event largest possible values when an event is received from any of the one or more peripheral devices, and reserving an area in the buffer for the task;
   determining whether or not another new event has been received from any of the one or more peripheral devices before process of the task is completed;
   deleting the task and releases the area in the buffer for the task upon completion of the process of the task if another new event has not been received;
   if another new event has been received and both the number of the tasks and the size of areas in the buffer for the tasks do not reach the event largest possible values, generating a new task and reserving an area in the buffer for the new task; and
   if another new event has been received and either the number of the tasks or the size of areas in the buffer for the tasks reaches any of the event largest possible values, reusing the task and the area for the task in the buffer for the new event after process of the task is completed.

* * * * *